A. MÜLLERS.
NAPPING MACHINE.
APPLICATION FILED MAR. 28, 1911.

1,019,515.

Patented Mar. 5, 1912.

Witnesses:
Katharine Koch.
Daniel Holmgren.

Inventor:
August Müllers
by his attorneys
Briesen & Jumpe

UNITED STATES PATENT OFFICE.

AUGUST MÜLLERS, OF MÜNCHEN-GLADBACH, GERMANY.

NAPPING-MACHINE.

1,019,515. Specification of Letters Patent. Patented Mar. 5, 1912.

Application filed March 28, 1911. Serial No. 617,466.

*To all whom it may concern:*

Be it known that I, AUGUST MÜLLERS, a citizen of the Empire of Germany, residing at München - Gladbach, in the Empire of Germany, have invented a new and useful Napping-Machine, of which the following is a specification.

My invention relates to an improvement in napping machines of that type, in which a number of parallel napping rollers are mounted to turn in bearings disposed along the periphery of two parallel circular supporting disks fastened on a driving shaft, all the parts named forming a rotary cylinder, which is driven at a certain speed in one direction, while the napping rollers are separately driven in the opposite direction, but at different speeds, the napping rollers proper being driven at a lower speed than the opposite napping rollers alternating with them. Such napping machines have already been modified in the manner, that the ordinary bearings for all of the napping rollers in the two supporting disks were replaced by ball-bearings, so as to reduce the friction between the napping roller shafts and the bearings and consequently also the driving power of the napping machine. However, the so modified napping machines did not work satisfactorily.

The improvement according to my invention consists in that only the rapidly rotating opposite napping rollers are made to turn in ball-bearings, while the slowly rotating napping rollers proper are mounted to turn in ordinary bearings.

I will now proceed to describe my invention with reference to the accompanying drawing, in which—

Figure 1:
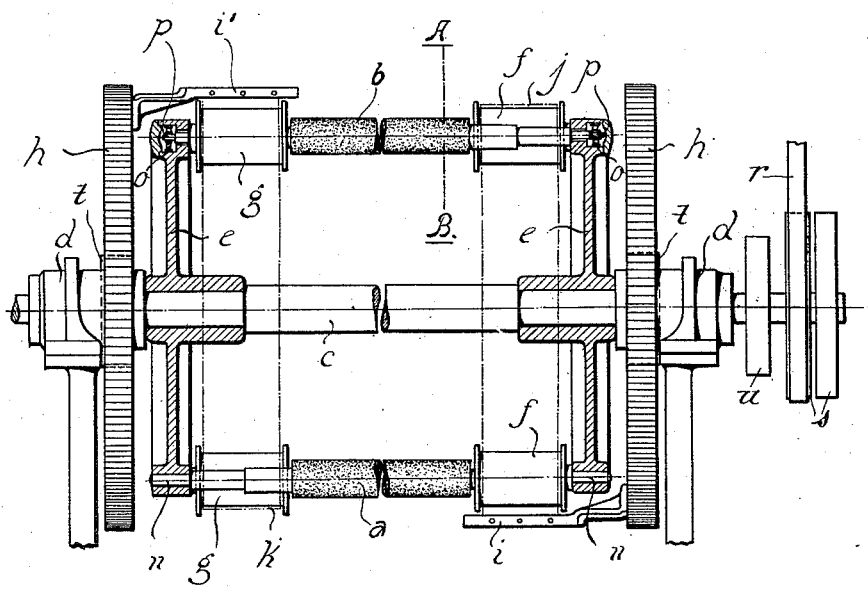
Figure 2:
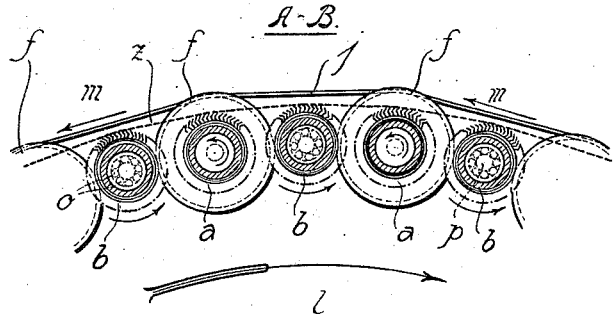

Figure 1 is a vertical longitudinal section through the rotary cylinder of an improved napping machine, two gear wheels and the bearings for the main shaft being shown in elevation, an intermediate part being omitted and only so much of the machine being illustrated as is necessary for the understanding of the invention, and Fig. 2 is a vertical cross section on an enlarged scale through the line A—B in Fig. 1.

Similar letters of reference refer to similar parts in both views.

The main shaft $c$ is rotatably mounted in suitable bearings $d$ and receives motion from a belt $r$ by fast and loose pulleys $s$. To shaft $c$ are secured a pair of circular disks $e\ e$, which carry along their periphery the bearings for the shafts of the several napping rollers $a$ and $b$. All the parts named so far constitute the rotary cylinder. The shafts of the napping rollers are here assumed to extend only from one disk $e$ to the other one and therefore the belt pulleys are disposed within the two disks $e\ e$. The slowly rotating napping rollers proper $a\ a$ have their driving pulleys $f\ f$ on one side near the right disk $e$ in Fig. 1 and the rapidly rotating opposite or counter napping rollers $b\ b$ have their driving pulleys $g\ g$ on the other side near the left disk $e$. Loose on the main shaft $c$ are two gear wheels $h\ h$, which are engaged by wheels $t\ t$, that receive rotary movement from a pulley $u$ of shaft $c$ by a suitable belt connection. Wheels $h\ h$ carry each two known belt drivers $i$ or $i'$ at a short distance from one another. The driving belt $j$ passing over the large pulleys $f\ f$ is fastened with its ends on the two drivers $i$, while the other driving belt $k$ passing over the small pulleys $g\ g$ is fastened with its ends on the two drivers $i'$. The rotary cylinder or drum formed by the parts $a$, $b$, $h$ is assumed to be driven by the main shaft $c$ in the direction of the arrow $l$ in Fig. 2, while the two driving belts $j$ and $k$ driven by the two gear wheels $h\ h$ move in the opposite direction, viz. that of the arrows $m\ m$.

In order to obtain the desired napping effect the napping rollers proper $a\ a$ require to have a relatively small peripheral speed in proportion to the peripheral speed of the rotary cylinder. The napping effect of these rollers is the larger, the slower their speed is, and the smaller, the higher their speed is. With the opposite napping rollers $b\ b$ the reverse is the case. In order to enable them to nap the fabric at all, their peripheral speed requires to be greater than that of the rotary cylinder. The slower their speed is, the smaller will be their napping effect, and the higher their speed is, the larger will be their napping effect.

From the above considerations it follows, that a certain friction of the journals in the bearings for the napping rollers proper $a\ a$ can only be advantageous for obtaining a more powerful and uniform napping effect, since this friction assists the driving belt $j$ in its effect. In consequence of this the belt $j$ need not be excessively strained and any slip of this belt can not have any bad influence upon the napping effect, which on the contrary would be the case, if there were no friction at all in the bearings. For this reason I employ ordinary bearings in the two disks e e for the journals n n of the shafts of the napping rollers proper a a. The ball-bearings as hitherto employed are not only useless, but also disadvantageous, since the driving belt would require to be the more strained, the more the friction in the bearings is reduced. Besides this the relatively insignificant surface of contact between the driving belt j and the pulleys f f renders a certain slip of the belt unavoidable, so that the napping rollers proper a a can actually not produce so uniform a napping effect with ball-bearings, as they can with ordinary bearings, more particularly, if a powerful napping is required. This statement is fully borne out by the experience. For the opposite napping rollers b b, however, the reverse is the case. A friction of the journals in the bearings would not help the belt k, but would operate obstructively in the attainment of a certain napping effect. Therefore it is more advantageous to employ ball-bearings for the opposite napping rollers, since owing to the reduction of the friction in the bearings the belt k will have to exert less power than before. I therefore employ ball-bearings o o for the journals p p of the rapidly rotating opposite napping rollers b b, as is shown at Fig. 1. Of course the ball-bearings may be replaced by their equivalents, such as roller-bearings, or the like, without altering the napping effect of the machine. My invention can also be applied to the rotary cylinder of napping machines, in which the shafts of the napping rollers alternately extend on either side beyond the supporting disk e for carrying a driving pulley, so that the pulleys corresponding to f f of the napping rollers proper a a are on one side of the rotary cylinder and the pulleys corresponding to g g of the opposite napping rollers b b are on the other side of the rotary cylinder, while two driving endless belts may be employed on both sides of the rotary cylinder and be driven in any known manner for driving the respective pulleys. In this case the gear wheels h h with the drivers i i' are dispensed with.

I claim:

In a napping machine, a frame, a shaft rotatably supported thereby, a pair of disks secured to the shaft, a plurality of napping rollers and a plurality of intermediate counter napping rollers arranged in a circle and jointly constituting a napping drum, means for rotating said drum in one direction, means for rotating the napping rollers in the opposite direction with a peripheral speed that is less than that of the drum, means for rotating the counter napping rollers in like direction with the napping rollers with a peripheral speed that exceeds that of the drum, friction bearings carried by the disks for the napping rollers, said bearings tending to retard the movement of said rollers, and anti-friction bearings mounted in the disks intermediate the friction bearings, said anti-friction bearings being engaged by the counter napping rollers.

AUGUST MÜLLERS.

Witnesses:
BESSIE F. DUNLAP,
OSCAR DEPNER.

---

Copies of this patent may be obtained for five cents each, by addressing the "Commissioner of Patents, Washington, D. C."